United States Patent [19]

Nanjyo et al.

[11] Patent Number: 4,462,363

[45] Date of Patent: Jul. 31, 1984

[54] IGNITION SYSTEM FOR INTERNAL COMBUSTION ENGINE

[75] Inventors: Hirotoshi Nanjyo, Mishima; Hiroshi Serizawa, Gotenba; Michio Sagae, Namazu, all of Japan

[73] Assignee: Kokusan Denki Co., Ltd., Shizuoka, Japan

[21] Appl. No.: 312,262

[22] Filed: Oct. 14, 1981

[30] Foreign Application Priority Data

Oct. 14, 1980 [JP] Japan .............................. 55-146050[U]
Nov. 28, 1980 [JP] Japan .............................. 55-170463[U]

[51] Int. Cl.³ .............................................. F02P 5/08
[52] U.S. Cl. ................................. 123/427; 123/149 C; 123/602
[58] Field of Search ........... 123/427, 418, 415, 149 C, 123/602, 149 A

[56] References Cited

U.S. PATENT DOCUMENTS

| | | | |
|---|---|---|---|
| 3,646,605 | 2/1972 | Plume, Jr. | 123/149 A |
| 3,799,136 | 3/1974 | Korteling | 123/427 |
| 3,890,944 | 6/1975 | Werner et al. | 123/427 |
| 3,937,193 | 2/1976 | Kim | 123/427 |
| 4,114,574 | 9/1978 | Platzer, Jr. | 123/415 |

FOREIGN PATENT DOCUMENTS

92430/74 9/1974 Japan.
36234/77 3/1977 Japan.

*Primary Examiner*—Andrew M. Dolinar
*Attorney, Agent, or Firm*—Pearne, Gordon, Sessions, McCoy, Granger & Tilberry

[57] ABSTRACT

This invention relates to an ignition system for an internal combustion engine in which an advance characteristic is provided by utilizing a discharge of a capacitor. The ignition system comprises an ignition coil, a semiconductor switch to control a primary current through the ignition coil, a signal coil to generate a signal of one cycle per one revolution of the internal combustion engine, an ignition position control circuit to produce a conducting signal for conducting the semiconductor switch with the signal from the signal coil used as a control signal. The ignition coil is operated by rapidly varying the primary current through the ignition coil by means of the conduction of the semiconductor switch.

The ignition position control circuit includes capacitor means, a capacitor charging circuit to charge the capacitor means with one polarity by a constant current flowing from a DC power source through a unilateral element such as a diode or a transistor, a capacitor discharging circuit having a discharge control switch conducting during leading one half cycle of a signal from the signal coil to discharge the capacitor means through the discharge control switch. The ignition control circuit further includes a reference voltage generating circuit to generate a reference voltage of a value lower than the maximum value of the voltage across the capacitor means and a conducting signal generating circuit to generate a conducting signal when the voltage across the capacitor means becomes lower than the reference voltage.

9 Claims, 8 Drawing Figures

→ ROTARY ANGLE OF MAGNETO GENERATOR ($\theta$)

IGNITION SYSTEM FOR INTERNAL COMBUSTION ENGINE

BACKGROUND OF THE INVENTION

Figure 1:
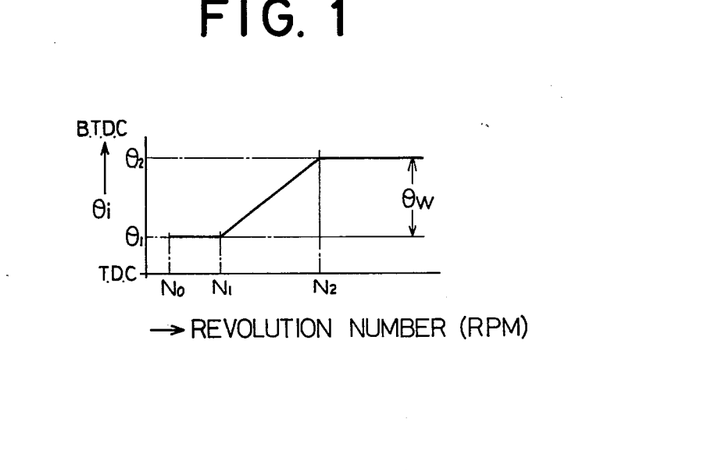
FIG. 1 illustrates an example of an advance characteristic required for an internal combustion engine.

In general, an internal combustion engine is required to have an ignition position controlled in accordance with revolution number of the engine. For example, as shown in FIG. 1, a four cycle internal combustion engine is required to have such an advance characteristic that it is ignited at a substantially constant ignition angle or position $\theta_1$ for an idling revolution $N_o$ (r.p.m.) to a setting revolution $N_i$ (r.p.m.) and that it is ignited with an advancing angle width $\theta_w$ of $\theta_1$ to $\theta_2$ of the ignition position in a middle and high revolution of the engine. In this figure, T.D.C. designates an upper dead point of a piston of the engine while B.T.D.C. designates a lower dead point of the engine piston. There have been proposed various ignition systems having such an advance characteristic. One of them is adapted to initiate to charge a capacitor at a given revolution angle of the engine, then to initiate to discharge the capacitor at a reference angle position with the discharging current controlled on the revolution number of the engine, and to ignite the engine at a position where the voltage across the capacitor is lowered to a given value. However, since the charge and discharge of the capacitor are controlled on the revolution number of the engine, respectively, the system is disadvantageously complicated.

SUMMARY OF THE INVENTION

Accordingly, it is a principal object of the invention to provide an ignition system for an internal combustion engine adapted to obtain a required advance characteristic with a simpler construction.

It is another object of the invention to provide an ignition system for an internal combustion engine adapted to control an ignition position with a simpler construction without controlling a charging current and a discharging current of an advancing capacitor in accordance with the revolution number (r.p.m.) of the engine for obtaining an advance characteristic and with a single switching element for controlling a period during which the capacitor is charged and discharged.

It is another object of the invention to provide an ignition system for an internal combustion engine adapted to decrease a capacitance of an advancing capacitor by charging a power source capacitor with one half cycle of an output from an AC generator and charging the advancing capacitor with the charge of the power source capacitor during another half cycle of the output from the AC generator.

The invention has such features that there is provided in a capacitor charging circuit a discharge control switch which has a conducting period determined on an output from a signal coil and that there is provided in a capacitor charging circuit discharge preventing means. When the discharge control switch is turned off, the capacitor is allowed to be charged and when the discharge control switch is turned on, the capacitor is discharged. The voltage across the capacitor is compared with a reference voltage, which causes the construction of the system to be more simplified.

In accordance with one aspect of the invention, there is provided an ignition system for an internal combustion engine comprising an ignition coil, a semiconductor switch to control a primary current through said ignition coil, a signal coil to generate a signal of one cycle per one revolution of said engine and an ignition position control circuit to produce a conducting signal for conducting said semiconductor switch with said signal from said signal coil used as a control signal, said semiconductor switch being conducted so that said primary current rapidly varies whereby said engine is ignited, characterized in that said ignition position control circuit comprises capacitor means; a capacitor charging circuit to charge said capacitor means with one polarity by a constant current flowing from a DC power source through a unilateral element; a capacitor discharging circuit having a discharge control switch conducting during leading one half cycle of a signal from said signal coil to discharge said capacitor means through said discharge control switch; a reference voltage generating circuit to generate a reference voltage of a value lower than the maximum value of the voltage across said capacitor means charged; and a conducting signal generating circuit to produce a conducting signal when the voltage across said capacitor means becomes lower than said reference voltage.

In accordance with another aspect of the invention, there is provided an ignition system for an internal combustion engine an ignition coil, an AC generator to generate an AC voltage in synchronism with rotation of said internal combustion engine, one half cycle of said AC voltage being applied to said ignition coil at its primary coil thereof to flow a primary current therethrough, a semiconductor switch to control said primary current through said ignition coil, a signal coil to generate a signal of one cycle per one revolution of said engine in synchronism therewith and an ignition position control circuit to produce a conducting signal for conducting said semiconductor switch with said signal from said signal coil used as a control signal, said semiconductor switch being conducted so that said primary current rapidly varies whereby said engine is ignited, characterized in that said ignition position control circuit comprises capacitor means; a capacitor charging circuit to charge said capacitor means with one polarity from a power source capacitor which is in turn charged through a unilateral element by said AC voltage of one half cycle from said AC generator; a capacitor discharging circuit having a discharge control switch to be conducted during leading one half cycle of a signal from said signal coil to discharge said capacitor means through said discharge control switch; a reference voltage generating circuit to generate a reference voltage of a value lower than the maximum value of a voltage across said capacitor means; and a conducting signal generating circuit to generate a semiconductor switch conducting signal when said voltage across said capacitor means becomes lower than said reference voltage and when said discharge control switch is changed from the conducting condition to the nonconducting condition while said voltage across said capacitor means is higher than said reference voltage.

BRIEF DESCRIPTION OF THE DRAWINGS

The above and other objects and features of the invention will be apparent from the description of the embodiments taken along with the accompanying drawings in which.

DETAILED DESCRIPTION OF THE EMBODIMENTS

Figure 2:
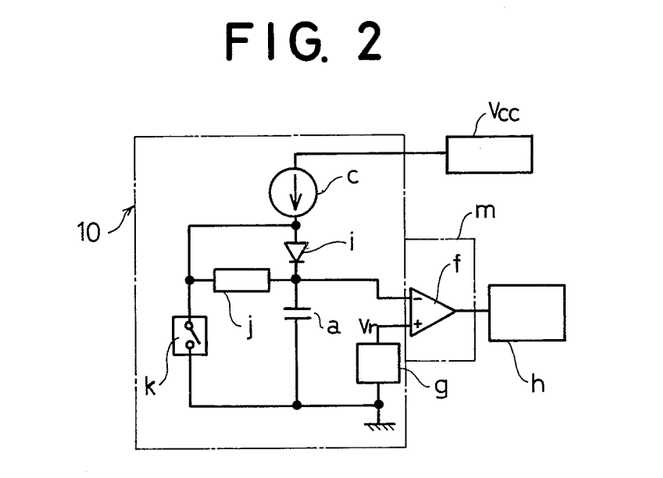
FIG. 2 is a schematic diagram of a fundamental construction of the invention.

In FIG. 2, a capacitor a is charged with one polarity from a DC power source Vcc such as a battery or a charged capacitor through a constant current charging circuit c and a diode i. A discharge control switch k is connected in parallel to the capacitor a through suitable current limiter j. The junction point between the current limiter j and the discharge control switch k is connected to the junction point between the constant current circuit c and the diode i. A voltage across the capacitor a is applied to a conducting signal generating circuit m together with a reference voltage Vr from a reference voltage generating circuit g. The conducting signal generating circuit m includes a comparator f to compare the voltage across the capacitor a with the reference voltage Vr. The conducting signal generating circuit m is adapted to generate a conducting signal for conducting a semiconductor switch of an ignition circuit h. An ignition position control circuit 10 is constituted by the portions other than the ignition circuit h.

In the construction of FIG. 2, the discharge control switch k is controlled by an output from a signal coil not shown in FIG. 2. The signal coil generates a signal of one cycle per one revolution of an internal combustion engine in synchronism therewith. The discharge control switch k is conducted only during leading one half cycle of the output from the signal coil. The capacitor a is charged at a constant current from the DC power source Vcc while the discharge control switch k is interrupted. Since the capacitor a is charged through the discharge preventing diode i, the capacitor a is never discharged while the discharge control switch k is interrupted, which causes the capacitor a to be kept at the charging state. When the output from the signal coil closes the discharge control switch k, the capacitor a is discharged through the current limiter j and the discharge control switch k to lower the voltage across the capacitor a. When the voltage across the capacitor a becomes lower than the reference voltage, the conducting signal generating circuit m generates the conducting signal which causes the semiconductor switch of the ignition circuit h to be conducted so as to ignite the internal combustion engine. Since the current from the DC power source Vcc bypasses the capacitor a through the discharge control switch k while the capacitor a is discharged, it never flows through the capacitor a. Thus, it will be noted that the capacitor a is discharged without any obstacle. This causes the ignition position to be controlled in accordance with the revolution number of the internal combustion engine and to have such an advance characteristic as shown in FIG. 1.

Figure 3:
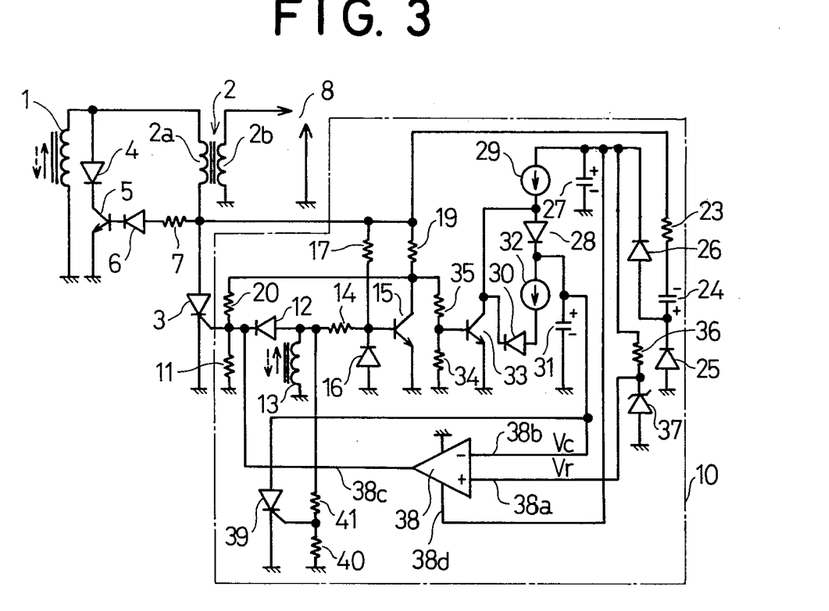
FIG. 3 is a diagram of one embodiment of the invention.

FIG. 3 shows one embodiment of the invention in which an advancing capacitor to be charged for obtaining an advance characteristic is adapted to be charged by discharging a power source capacitor which is charged by an AC generator.

In FIG. 3, a generating coil 1 of a magneto AC generator is driven by an internal combustion engine not shown and an ignition coil 2 includes a primary coil 2a and a secondary coil 2b. The AC generator may be used of more than four poles. One end of the generating coil 1 is grounded while the other end thereof is connected to one end of the primary coil 2a. The other end of the primary coil 2a is connected to an anode of a thyristor 3, the cathode of which is grounded. To the junction point between the primary coil 2a and the generating coil 1 through a diode 4 is connected a collector of an NPN transistor 5, an emitter of which is grounded. A base of the transistor 5 is connected to a cathode of a diode 6, an anode of which is connected through a resistor 7 to the junction point between the primary coil 2a and the anode of the thyristor 3. The secondary coil 2b of the ignition coil is connected to an ignition plug 8 provided in a cylinder of the internal combustion engine. A fundamental circuit of a current interrupting ignition system in which the transistor 5 is used for a primary current controlling semiconductor switch may be composed of the components 1 to 8 aforementioned.

The above fundamental circuit is conventional. When the generating coil 1 generates an output voltage of one half cycle in the direction of solid line as shown in FIG. 1, a base current flows from the generating coil 1 through the primary coil 2a, the resistor 7 and the diode 6 to the base of the transistor 5 to turn on the transistor 5. This causes a primary current which is nearly a short-circuit current to flow through the collector and the emitter of the transistor 5. When there reaches the ignition position where the primary current is fully large, the igniting signal is applied to the thyristor 3 to turn it on. This causes the potential at the base of the transistor 5 to be lowered to the grounded potential. Thus, the transistor 5 is turned off and as a result the primary current from the generating coil 1 is interrupted when a high voltage is induced across the generating coil 1. The high voltage across the generating coil 1 is transferred by the ignition coil 2 to a higher voltage which is applied to the ignition plug 8. Thus, a spark is established at the ignition plug 8 to ignite the corresponding cylinder. It will be understood that since the thyristor 3 instructs the engine to be ignited, the ignition position is controlled by varying the phase at which the igniting signal is applied to the thyristor 3.

An ignition position control circuit 10 is provided which controls the ignition position in accordance with the revolution number of the internal combustion engine. The ignition position control circuit 10 comprises a signal coil 13 which may be provided in the magneto generator having the generating coil 1 or in a separate signal generator to generate a signal of one cycle per one revolution of the engine. The signal coil 13 is connected through a diode 12 to a resistor 11 which is in turn connected in parallel between the gate and cathode of the thyristor 3. One end of the signal coil 13 is grounded while the other end of the signal coil 13 is connected through a resistor 14 to a base of an NPN transistor 15, an emitter of which is grounded. Between the base and the emitter of the transistor 15 is connected a cathode of a diode 16, an anode of which is grounded. The junction point between the cathode of the diode 16 and the base of the transistor 15 is connected through a resistor 17 to the anode of the thyristor 3. Also, the collector of the transistor 15 is connected through a resistor 19 to the anode of the thyristor 3. To the junction point between the resistor 19 and the collector of the transistor 15 is connected one end of a resistor 20, the other end of which is connected to the gate of the thyristor 3.

To the anode of the thyristor 3 through a resistor 23 is connected one end of a first capacitor 24, the other end of which is connected to a cathode of a diode 25 with an anode thereof grounded. An anode of a diode 26 is connected to the junction point between the capacitor 24 and the cathode of the diode 25 while a cathode of the diode 26 is connected to one end of a capacitor 27, the other end of which is grounded. The nongrounded end of the capacitor 27 is connected to one end of a constant current circuit 29. The constant current circuit 29 may conventionally comprise a field effect transistor having a gate connected through a resistor or directly to a source thereof, for example. A second capacitor 31 at one end is connected through a diode 28 to the other end of the constant current circuit 29. The other end of the second capacitor 31 is grounded. An NPN transistor 33 has a collector connected through a constant current circuit 32 and a diode 30 to the cathode of the diode 28 and also directly to the anode of the diode 38, a base through a resistor 34 grounded and an emitter directly grounded. The base of the transistor 33 is also connected through a resistor 35 to the collector of the transistor 15.

A voltage comparator 38 is provided which has a plus input terminal 38a and a minus input terminal 38b. A series connection of a resistor 36 and a Zener diode 37 is connected in parallel through the diode 26 to the diode 25. The Zener diode 37 is connected to the plus input terminal 38a so that a reference voltage Vr is applied to the plus input terminal 38a of the comparator 38 while the second capacitor 31 is connected to the minus input terminal 38b of the comparator 38 so that a voltage Vc across the second capacitor 31 is applied to the minus input terminal 38b of the comparator 38. The comparator 38 at its nongrounded output terminal 38c is connected to the gate of the thyristor 3 while the comparator 38 at its power source terminal 38d is connected to the nongrounded end of the capacitor 27. The comparator 38 is provided at its final stage with a switching element not shown and connected between the output terminal 38c and the ground. The comparator 38 has a ground potential at its output terminal 38c when the voltage Vc across the capacitor 31 is higher than the reference voltage Vr and has a nongrounded state at its output terminal 38c when the voltage Vc across the capacitor 31 is lower than the reference voltage Vr. Thus, it will be noted that when the voltage Vc across the capacitor 31 is higher than the reference voltage Vr, the gate and cathode of the thyristor 3 is grounded so that the igniting signal is prevented from being applied to the thyristor 3, and that when the voltage Vc is equal or lower than the reference voltage Vr, the igniting signal is allowed to be applied to the thyristor 3.

A thyristor 39 with its cathode grounded is provided across the capacitor 31. The gate of the thyristor 39 is connected through a resistor 40 to the ground and also through a resistor 41 to the nongrounded end of the signal coil 13.

In the embodiment of FIG. 3, the capacitor 31 corresponds to the capacitor a of FIG. 2 and the DC power source to charge the capacitor 31 is composed of the generating coil 1, the diodes 25 and 26, the capacitors 24 and 27 and the resistor 23. A reference voltage generator of the diode 26, the resistor 36 and the Zener diode 37 corresponds to the reference voltage generator g of FIG. 2. A capacitor charging circuit comprises the constant current circuit 29 and the diode 28. This capacitor charging circuit charges the capacitor 31 at a constant current with one polarity. The diode 28 corresponds to the discharge preventing diode i of FIG. 2. The constant current circuit 32 corresponds to the current limitter j of FIG. 2. A capacitor discharging circuit comprises the constant current circuit 32, the diode 30 and a discharge control switch of the transistors 33 and 15. An igniting or conducting signal generating circuit comprises the transistor 15, the resistors 19 and 20 and the comparator 38. The igniting signal generating circuit generates an igniting signal for the thyristor 3 (the semiconductor switch of the ignition circuit) when the voltage across 31 is equal to or lower than the reference voltage. In other words, the transistor 15 serves as a switch for controlling the discharge control switch and also as a control switch of the igniting signal generator.

More particularly, when the transistor 15 is interrupted, a signal is allowed to be applied to the thyristor 3 from the generating coil 1, through the primary coil 2a and the resistors 19 and 20, and when the transistor 15 is conducted, the signal is prevented from being applied to the thyristor 3. Also, when the transistor 15 is conducted, the transistor 33 is interrupted to allow the capacitor 31 to be charged. As aforementioned, the transistors 15 and 33 constitute the discharge control switch to control the discharge of the capacitor 31 and when the transistor 15 is interrupted, the transistor 33 is conducted to discharge the capacitor 31. At that time, the current to charge the capacitor 31 bypasses through the transistor 33 out of the capacitor 31. The thyristor 39 and the resistors 40 and 41 constitute a reset circuit to discharge the capacitor 31.

In the ignition system of FIG. 3, on the condition of the output terminal 38c of the comparator 38 nongrounded, when the signal coil 13 generates the signal in the direction of solid line of FIG. 1 (referred to as a forward signal thereinafter), the igniting signal is applied through the diode 12 to the thyristor 3. Also, on the condition of the output terminal 38c of the comparator 38 nongrounded, when the transistor 15 is interrupted, the igniting signal is applied through the resistors 19 and 20 to the thyristor 3. The resistor 17 serves to supply the base current to the transistor 15. This resistor 17 has such a substantially large value that the igniting signal is prevented from being applied through the resistors 17 and 14 and the diode 12 to the thyristor 3.

Provided that the magneto generator having the generating coil 1 is of four poles, the generating coil 1 generates the voltage of two cycles per one revolution of the engine. During every half cycle at which the generating coil 1 induces the voltage in the direction of solid line in FIG. 3 (referred to as the forward voltage thereinafter), a current I flows from the generating coil 1 through the diode 4 and the transistor 5. FIG. 4A shows the waveform of the current I relative to the rotation angle $\theta$ of the engine. As shown in FIG. 4B, while the generating coil 1 induces the forward voltage, the signal coil 1 generates a reverse or negative signal $e_s$ as indicated at a broken line in this figure and then generates a forward or positive signal $e_{s'}$. The angle $\theta_1$ where the forward signal $e_{s'}$ is raised up corresponds to the ignition position at the revolution number $N_1$ of the advance characteristic of FIG. 1 or less than while the angle $\theta_2$ where the reverse signal $e_s$ is established corresponds to the ignition position at the revolution number $N_2$ or more than. Thus, it will be noted that the width at which the signal coil 13 generates the reverse signal $e_s$ corresponds to the advance width $\theta_w$.

Figure 4:
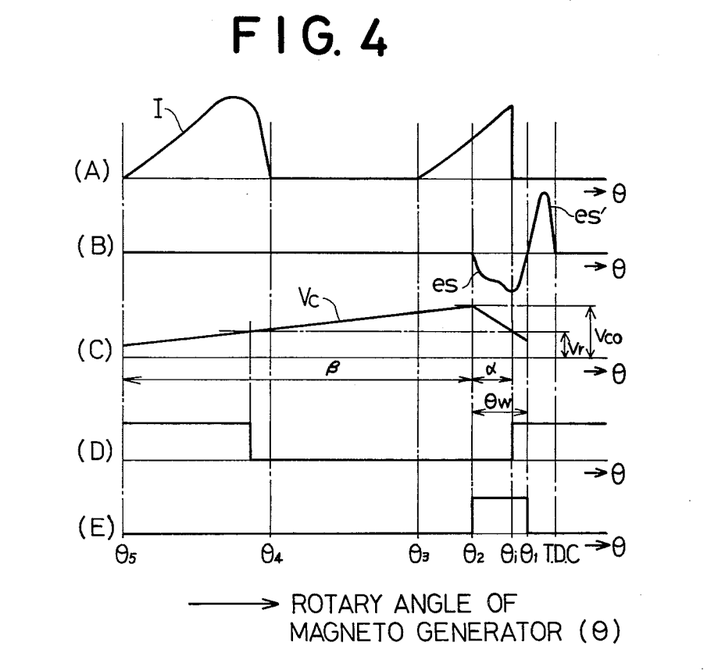
FIGS. 4A to 4E illustrate waveforms at portions of the embodiment of FIG. 3.

At the position prior to the angle $\theta_5$ of FIG. 4, when the generating coil 1 generates the reverse or negative voltage of half cycle as indicated at a broken line of FIG. 3, the first capacitor 24 is charged with the shown polarity from the generating coil 1 through the diode 25, the first capacitor 24, the resistor 23 and the primary coil 2a. At the angle $\theta_5$, when the generating coil 1 generates the forward voltage, the current I flows through the collector and emitter of the transistor 5, and at the same time, the base current for the transistor 15 flows through the primary coil 2a and the resistor 17. As a result, the transistor 15 is turned on while the transistor 33 is turned off. The interruption of the transistor 33 causes the charge of the capacitor 24 to be discharged through the diode 26 so as to charge the capacitor 27 and also to be discharged through the diode 26, the constant current circuit 29 and the diode 28 so as to charge the capacitor 31 at the constant current with the polarity shown. Thus, the voltage Vc is linearly increased as shown in FIG. 4C. While the generating coil 1 induces the reverse voltage between the angles $\theta_4$ and $\theta_3$, the first capacitor 24 is recharged by the reverse voltage from the generating coil 1. Since the base currents never flow through the transistors 15 and 33, they are interrupted so as to prevent the capacitor 31 from being discharged and so as to charge it from the capacitor 27. At the angle $\theta_3$, the generating coil 1 again induces the forward voltage, when the current I flows from the generating coil 1 through the diode 4 and the transistor 5. At that time, the transistor 15 is turned on while the transistor 33 is turned off. The interruption of the transistor 33 causes the second capacitor 31 to continue to be charged. Thereafter, at the angle $\theta_2$, the signal coil 13 generates the reverse signal $e_s$ of half cycle and the transistor 15 is turned off while the transistor 33 is turned on. Thus, the current to charge the second capacitor 31 bypasses through the transistor 33 out of the capacitor 31 and therefore the capacitor 31 stops being charged. At that time, the capacitor 31 is discharged at the constant current so that the voltage Vc across the capacitor 31 is linearly decreased as shown in FIG. 4C. While the voltage Vc across the capacitor 31 is higher than the reference voltage Vr, the output terminal 38c of the comparator 38 is at the ground potential with the result that no igniting signal is applied to the thyristor 3 even though the transistor 15 is interrupted. When the voltage Vc equals the reference voltage Vr at the angle $\theta_i$, the output terminal of the comparator 38 is grounded. At that time, if the signal coil 13 induces the reverse signal $e_s$ so as to interrupt the transistor 15, the igniting signal is applied to the thyristor 3 through the generating coil 1, the primary coil 2a, the resistors 19 and 20 and the gate of the thyristor 3 so as to turn it on. This causes the transistor 5 to be turned off and the current I to be interrupted so as to operate the ignition coil 2 to spark the ignition plug 8. FIG. 4D shows variation in the potential at the output terminal of the comparator 38 while FIG. 4E shows variation in the potential at the collector of the transistor 15.

Let it supposed that the charging current of the second capacitor 31 is indicated at $i_1$, the discharging current of the capacitor 31 at $i_2$ and the static capacitance of the capacitor 31 at C. Also, let it supposed that the revolution number of the engine is indicated at N (r.p.m.), the width between the angles $\theta_2$ and $\theta_i$ is $\alpha°$ and the angle $\beta°$ is substantially equal to the angle $(360° - \theta_w)$. The maximum value $V_{co}$ of the voltage across the capacitor 31 is expressed as follows;

$$V_{co} = (i_1/C)(1/6N)\beta° \quad (1)$$

When the transistor 15 is interrupted so as to discharge the capacitor 31, the voltage Vc across the capacitor 31 is expressed as follows;

$$V_c = V_{co} - (i_2/C)(1/6N)\alpha° \quad (2)$$

When the expression (2) is replaced by the expression (1), $$V_c = (i_1/C)(1/6N)\beta° - (i_2/C)(1/6N)\alpha° \quad (3)$$

If the value of $\alpha°$ is determined on the expression (3), $$\alpha° = (i_1/i_2)\beta° - (VrC/i_2)6N \quad (4)$$

Thus, the angle $\theta_i$ at which the output terminal of the comparator 38 is nongrounded between the angles $\theta_2$ and $\theta_1$ is expressed as follows;

$$i = \theta_2 - \alpha°$$
$$= \theta_2 - (i_1/i_2)\beta° + (VrC/i_2)6N \quad (5)$$

As apparent from the expression (5), the angle $\theta_i$ is a function of the revolution number N with result that the angle $\theta_i$ advances as the revolution number increases. If the revolution number reaches $N_1$ and if the following expression is met;

$$\theta_1 = \theta_2 - (i_1/i_2)\beta° + (VrC/i_2)6N_1 \quad (6)$$

then, since the angle $\theta_i$ of the expression (5) enters the section between the angles $\theta_1$ and $\theta_2$ of the reverse signal $e_s$ relative to more than the revolution number $N_1$, the transistor 15 is interrupted at the angle $\theta_i$ where the igniting signal is applied to the thyristor 3 to operate the ignition coil. Since the angle $\theta_i$ of the expression (5) linearly increases as the revolution number N increases, the ignition position linearly advances as the revolution number increases. When the revolution number exceeds $N_2$, the time in which the capacitor 31 is charged is shorter so that the capacitor 31 is never charged at the voltage more than the reference voltage Vr. Thus, the output terminal of the comparator 38 is grounded. As a result, the reverse signal $e_s$ is generated at the angle $\theta_2$ so that the transistor 15 is turned off and so that the igniting signal is applied to the thyristor 3. Thus, it will be noted that the ignition position is constant at the angle $\theta_2$ for more than $N_2$ of the revolution number of the engine. On the other hand, for less than $N_1$ of the revolution number, the output terminal 38c of the comparator 38 is never nongrounded at the section between the angles $\theta_1$ and $\theta_2$ where the transistor 15 is interrupted. When the signal coil 13 induces the forward signal $e_{s'}$ at the angle $\theta_1$, the igniting signal is applied to the thyristor 39 so that it is conducted with the result that the second capacitor 32 is discharged through the thyristor 39. This causes the output terminal 38c of the comparator 38 to be nongrounded. Therefore, the igniting signal is applied from the signal coil 13 through the diode 12 to the thyristor 3. Thus, it will be noted that the ignition is made at the constant position $\theta_1$ for less than $N_1$ of the revolution number.

With the embodiment of FIG. 3, such an advance characteristic as shown in FIG. 1 can be obtained. It should be understood that the inclination of the advance, the revolution number $N_1$ at which the advance begins and the revolution number $N_2$ at which the advance terminates are based on the charging current $i_1$, the discharging current $i_2$, the reference voltage Vr and the capacitance of the capacitor 31. It should be also noted that the ignition time can be precisely controlled without any complicated circuit such as detector of the revolution numbers $N_1$ and $N_2$.

It should be also understood that the ignition circuit may be of any type if the ignition position is determined on conduction of a semiconductor switch such as a thyristor which is to be turned on by a conducting signal. For example, the thyristor 3 of the embodiment of FIG. 3 may be replaced by a transistor switch. Also, the current interrupting type ignition circuit may be replaced by a capacitor discharging type ignition circuit.

Figure 5:
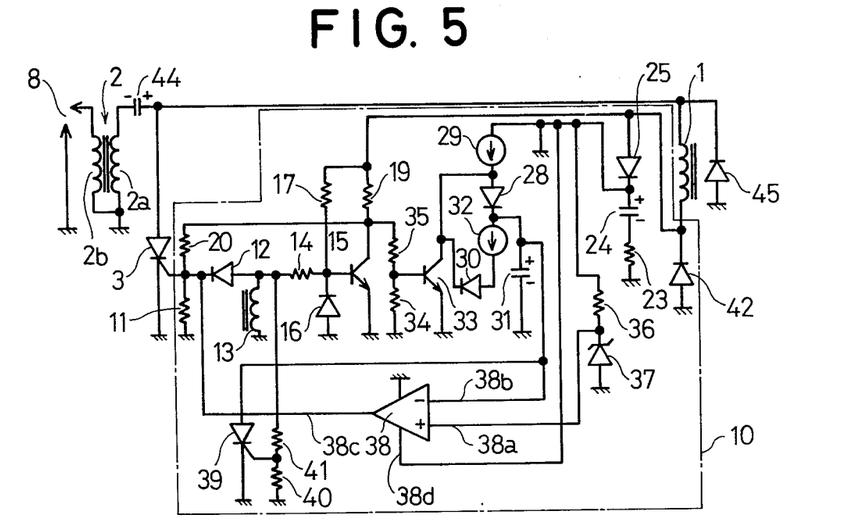
FIG. 5 is a diagram of another embodiment of the invention.

FIG. 5 shows another embodiment of the invention in which a capacitor discharging type ignition circuit. The same numerals designate the same components. The generating coil 1 has one end connected to a cathode of a diode 42, an anode of which is grounded, and the other end connected to one end of a capacitor 44. The primary coil 2a of the ignition coil 2 has one end connected to the other end of the capacitor 44 and the other end grounded together with the secondary coil 2b. The thyristor 3 has an anode connected to the junction point between the generating coil 1 and the capacitor 44 and the cathode grounded. A diode 45 has a cathode connected to the junction point between the generating coil 1 and the capacitor 44 and an anode grounded. Those components as aforementioned constitute the capacitor discharging type ignition circuit. When the generating coil 1 induces the forward voltage, the capacitor 44 is charged with the polarity shown. Thereafter, the thyristor 3 is given the igniting signal at the ignition position to be turned on. This causes the capacitor 44 to be discharged through the thyristor 3 and the primary coil 2a so that a large current flows through the primary coil 2a. Thus, a high voltage is induced by the secondary coil 2b so as to spark the ignition plug 8.

The first capacitor 24 of the ignition position control circuit 10 has one end connected to the grounded end of the generating coil 1 through the diode 25 and the other end grounded through a resistor. The capacitor 24 is charged by the reverse voltage from the generating coil 1 through the diode 25, the capacitor 24 and the diode 45. The other components of the ignition position control circuit 10 may be substantially identical to those of the embodiment of FIG. 3. Also, since the operation of the embodiment of FIG. 5 is the same as that of the embodiment of FIG. 3, the description thereof is omitted.

Figure 6:
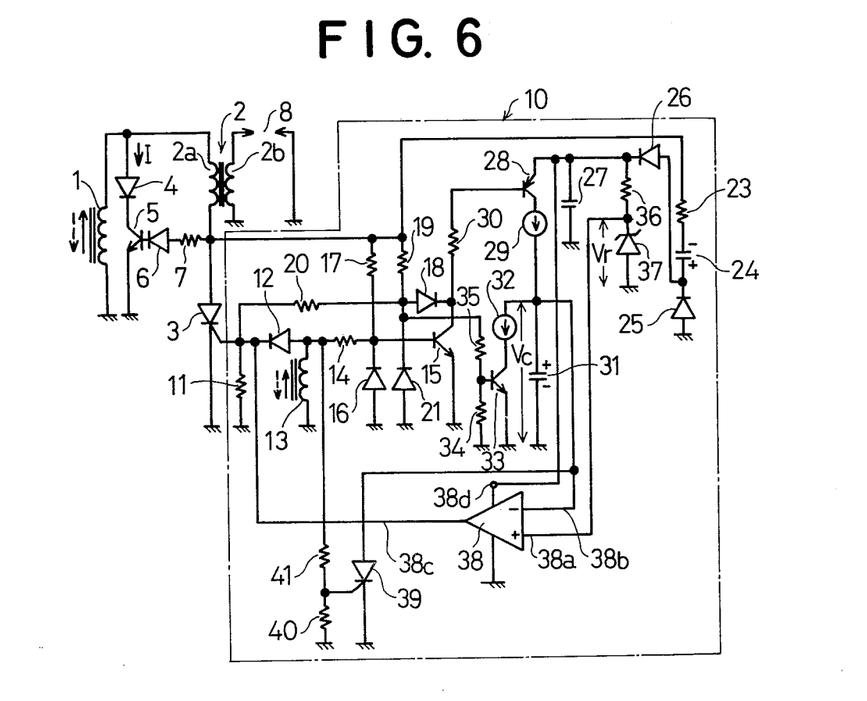
FIG. 6 is a diagram of another embodiment of the invention.

FIG. 6 shows another embodiment in which a capacitor discharging type ignition circuit is used in the same manner as in the embodiment of FIG. 5. The same numerals designate the same components except for numeral 28. In this embodiment, a PNP transistor 28 is used as discharge preventing means. The transistor 28 is conducted while the discharge control switch of the transistor 33 is interrupted, to allow the capacitor 31 to be charged. The transistor 28 is interrupted while the transistor 33 is conducted, to prevent the capacitor 31 to be discharged on the power source side. Thus, the capacitor can be discharged at a constant current only through the constant current circuit 32 and the transistor 33 because the transistor 28 prevents the capacitor 31 from being discharged through the components other than the transistor 33. The transistor 28 has an emitter connected to the nongrounded end of the capacitor 27, a collector connected to one end of the constant current circuit 29 and a base connected through the resistor 30 to the collector of the transistor 15. A diode 18 has a cathode connected to the junction point between the resistor 30 and the collector of the transistor 15 and an anode connected to the junction point between the resistor 19 and the cathode of the diode 21. The base of the transistor 33 is connected through the resistor 35 to the junction point between the resistor 19 and the cathode of the diode 21. In this embodiment, when the transistor 15 is turned off, the transistor 33 is turned on so as to discharge the capacitor 31.

Figure 7:
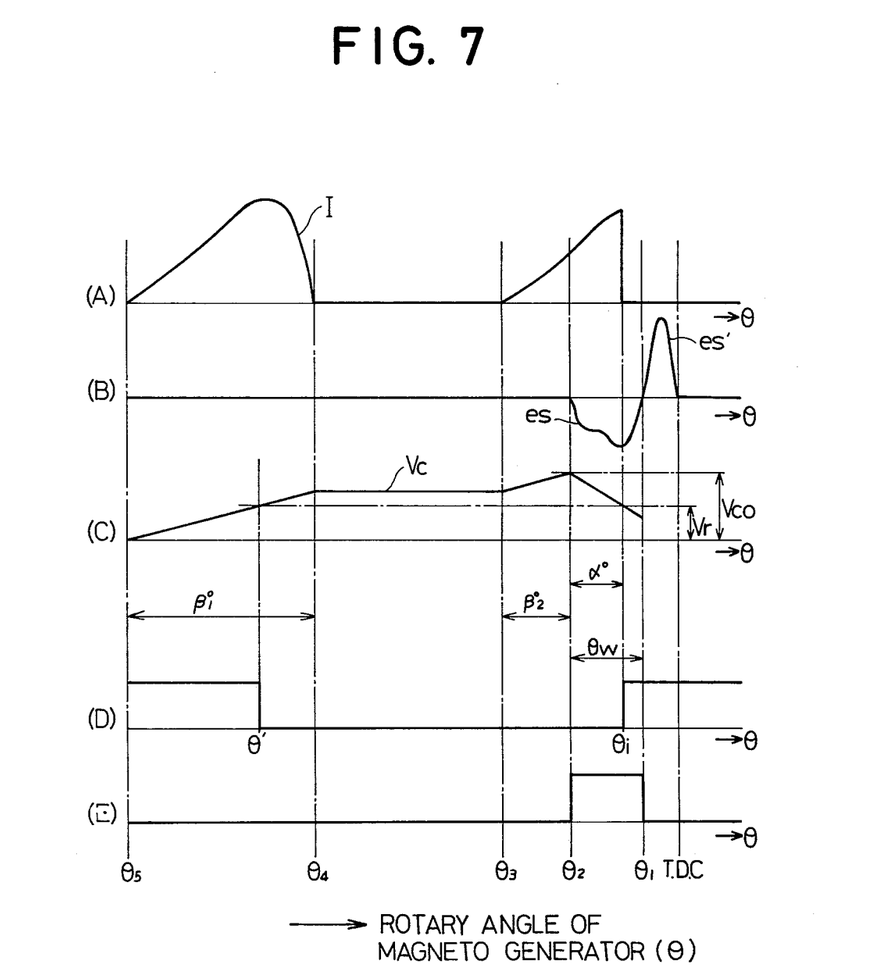
FIGS. 7A to 7E illustrate waveforms at portions of the embodiment of FIG. 6.

FIGS. 7A to 7E show the waveforms at the portions of FIG. 6 in the same manner as FIGS. 4A to 4E, except for FIG. 7C different from FIG. 4C in the waveform. The operation of the embodiment of FIG. 6 from beginning of the charge of the capacitor 31 to termination of the discharge of the capacitor 31 is as follows; When the generating coil 1 induces the forward voltage at the angle $\theta_5$, the current I flows through the collector and emitter of the transistor 5 and at the same time the base current for the transistor 15 flows through the primary coil 2a and the resistor 17. Thus, the transistor 15 and then the transistor 28 are turned on, and the transistor 33 is turned off. The conduction of the transistor 28 causes the first capacitor 24 which is already charged by the negative voltage of one half of the generating coil 1 to be discharged through the diode 26, the transistor 28 and the constant current circuit 29 so as to charge the second capacitor 31 with the polarity shown. Thus, the voltage Vc across the second capacitor 31 linearly increases at the section between the angles $\theta_5$ and $\theta_4$ as shown in FIG. 7C. At the section between the angles $\theta_4$ and $\theta_3$ are the transistors 15 and 28 so that the second capacitor 31 stops being charged while the first capacitor 24 is recharged by the negative voltage across the generating coil 1. Since the transistor 33 has no base current flowing therethrough at the section between the angles $\theta_4$ and $\theta_3$ so as to interrupt it, the capacitor 31 is prevented from being discharged. When the generating coil 1 again induces the forward voltage at the angle $\theta_3$, the current I flows from the generating coil 1 through the diode 4 and the transistor 5 and at the same time the transistor 15 is turned on so as to again charge the second capacitor 31. Thereafter, when the signal coil 13 induces the reverse signal $e_s$ of half cycle at the angle $\theta_2$, the transistors 15 and 28 are interrupted while the transistor 33 is turned on. Thus, the second capacitor 31 stops being charged and begins to be discharged so that the voltage Vc across the second capacitor 31 linearly decreases as shown in FIG. 7C. The description of further operation is omitted because they are substantially identical to that of the embodiment of FIG. 3. Suppose that the width between the angles $\theta_5$ and $\theta_4$ is $\beta_1°$ and that the width between the angles $\theta_3$ and $\theta_2$ is $\beta_2°$, if $\beta°$ is substantially equal to $(\beta_1°+\beta_2°)$, the expressions (5) and (6) of the embodiment of FIG. 3 may be applied to the embodiment of FIG. 6.

Figure 8:
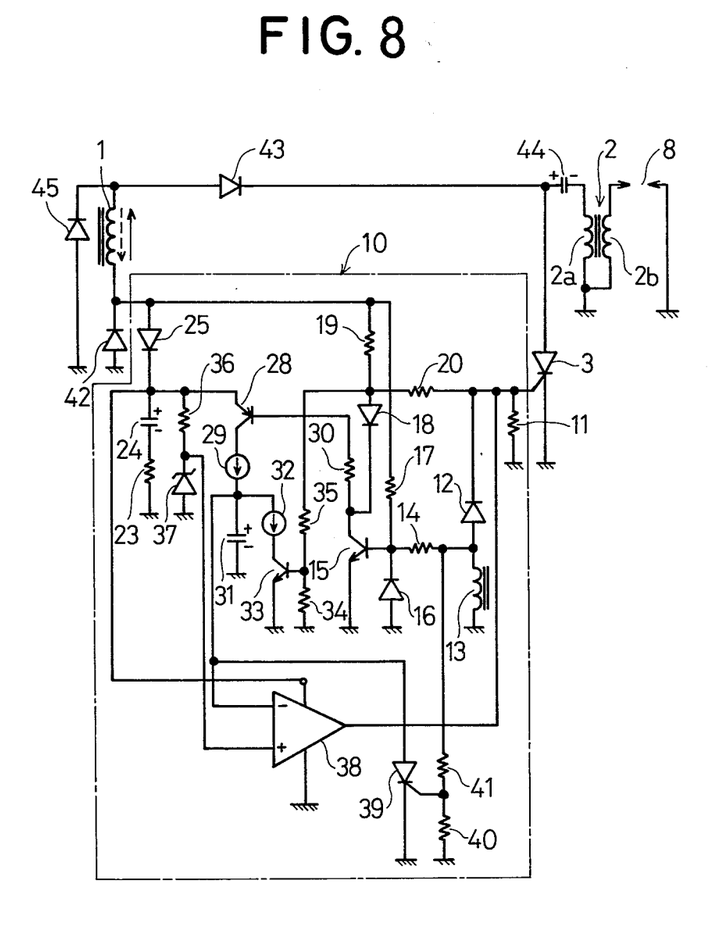
FIG. 8 is a diagram of another embodiment of the invention.

FIG. 8 shows further embodiment in which a capacitor discharging ignition circuit is used and the transistor 28 is used as the discharge preventing means. The construction of the ignition circuit is substantially identical to that of the embodiment of FIG. 5. The first capacitor 24 of the ignition position control circuit 10 is connected through the diode 25 to the grounded end of the generating coil 1 and also through the resistor 23 grounded. The reverse voltage induced by the generating coil 1 causes the first capacitor 24 to be charged through the diode 25, the resistor 23 and the diode 45. The other constructions of the ignition position control circuit 10 are substantially similar to those of the embodiment of FIG. 6. The same numerals designate the same components. The description of the operation is omitted because it is substantially identical to that of the embodiment of FIG. 6.

Although some preferred embodiments of the invention have been illustrated and described with reference to the accompanying drawings, it will be understood by those skilled in the art that they are by way of example, and that various changes and modifications might be made without departing from the spirit and scope of the invention, which is intended to be defined only to the appended claims.

What is claimed is:

1. An ignition system for an internal combustion engine comprising an ignition coil, an AC generator to generate an AC voltage in synchronism with rotation of said engine, means for supplying electric power generated by said AC generator during one half cycle of said AC voltage for causing a primary current to flow though a primary coil of said ignition coil, a semiconductor switch to control said primary current through said primary coil, a signal coil to generate a signal of one cycle per one revolution of said engine in synchronism therewith and an ignition position control circuit to produce a conducting signal for causing conduction of said semiconductor switch with said signal from said signal coil used as a control signal, said semiconductor switch being caused to conduct so that said primary current rapidly varies whereby said engine is ignited, characterized in that said ignition position control circuit comprises;
   capacitor means;
   a capacitor charging circuit to charge said capacitor means with one polarity from a power source capacitor which is in turn charged through a unilateral element by said AC voltage of another half cycle from said AC generator;
   a capacitor discharging circuit having a discharge control switch to be caused to conduct during the leading half cycle of said signal from said signal coil to discharge said capacitor means through said discharge control switch;
   a reference voltage generating circuit to generate a reference voltage of a value lower than the maximum value of a voltage across said capacitor means;
   and a conducting signal generating circuit to generate said conducting signal when said voltage across said capacitor means becomes lower than said reference voltage.

2. An ignition system for an internal combustion engine as set forth in claim 1, and further comprising a reset circuit including a switching element to be conducted with the output of another half cycle from said signal coil to discharge said capacitor means therethrough.

3. An ignition system for an internal combustion engine as set forth in claim 1, wherein said unilateral element is a diode.

4. An ignition system for an internal combustion engine as set forth in claim 1, wherein said unilateral element is a transistor which is connected to be interrupted when said discharge control switch is conducted.

5. An ignition system for an internal combustion engine as set forth in claim 1, wherein said capacitor charging circuit comprises said unilateral element and a constant current circuit.

6. An ignition system for an internal combustion engine as set forth in claim 1, wherein said capacitor discharging circuit comprises said discharge control switch and a constant current circuit connected in series to said discharge control switch.

7. An ignition system for an integral combustion engine as set forth in claim 1, and said discharge control switch being connected in parallel to said capacitor means so that when said discharge control switch is conducted, a charging current for said capacitor means bypasses said capacitor means and said capacitor means is discharged through said discharge control switch.

8. An ignition system for an internal combustion engine as set forth in claim 1, wherein said conducting signal generating circuit comprises a voltage comparator to allow said conducting signal to be supplied to said semiconductor switch when said voltage across said capacitor means is less than said reference voltage, a conducting signal supplying circuit to supply said conducting signal to said semiconductor switch from said AC generator at one half cycle of said output voltage therefrom, a control switching circuit to allow said conducting signal to be supplied to said semiconductor switch through said conducting signal supplying circuit when being interrupted during said one half cycle of said signal from said signal coil and during one half cycle of said AC voltage from said AC generator, said control switching circuit being conducted during the other period, a reset circuit including a switching element to be conducted with said output signal of another half cycle from said signal coil to discharge said capacitor means, and means to supply said output signal of another half cycle from said signal coil as said conducting signal, said conducting signal supplied through said conducting signal supplying circuit being supplied only when said voltage comparator and said control switching circuit allow said conducting signal to be supplied while said conducting signal from said signal coil is supplied to said semiconductor switch only when said voltage comparator allows said conducting signal to be supplied.

9. An ignition system for an internal combustion engine comprising an ignition coil, an AC generator to generate an AC voltage in synchronism with rotation of said engine means for supplying electric power generated by said AC generator during one half cycle of said AC voltage for causing a primary current to flow through a primary coil of said ignition coil, a semi conductor switch to control said primary current through said primary coil, a signal coil to generate a signal of one cycle per one revolution of said engine in synchronism therewith and an ignition position control circuit to produce a conducting signal for causing conduction of said semiconductor switch with said signal from said signal coil used as a control signal, said semiconductor switch being caused to conduct so that said primary current rapidly varies whereby said engine is ignited, characterized in that said ignition position control circuit comprises;

a capacitor means;

a capacitor charging circuit to charge said capacitor means with one polarity from a power source capacitor which is in turn charged through a diode and a first constant current circuit by said AC voltage of another half cycle from said AC generator;

a capacitor discharging circuit having a discharge control switch connected in parallel to said capacitor means through a second constant current circuit, said discharge control switch being caused to conduct during the leading half cycle of said signal from said signal coil so that the charging current for said capacitor means bypasses said capacitor means and said capacitor means is discharged through said discharge control switch and said second constant current circuit;

a reference voltage generating circuit to generate a reference voltage of a value lower than the maximum value of a voltage across said capacitor means;

a conducting signal generating circuit to generate said conducting signal when said voltage across said capacitor means becomes lower than said reference voltage;

and a reset circuit including a switching element caused to conduct with the output of another half cycle from said signal coil to discharge said capacitor means therethrough.

* * * * *